(12) United States Patent
Panetta et al.

(10) Patent No.: US 12,332,879 B2
(45) Date of Patent: Jun. 17, 2025

(54) OBJECT-BASED SEARCH PROCESSING

(71) Applicant: Caret Holdings, Inc., Columbus, OH (US)

(72) Inventors: Michael A. Panetta, Grandview Heights, OH (US); James Wilbert Devine, Columbus, OH (US); Daniel Craig Manges, Powell, OH (US)

(73) Assignee: Caret Holdings, Inc., Columbus, OH (US)

( * ) Notice: Subject to any disclaimer, the term of this patent is extended or adjusted under 35 U.S.C. 154(b) by 0 days.

(21) Appl. No.: 18/490,587

(22) Filed: Oct. 19, 2023

(65) Prior Publication Data

US 2024/0086401 A1 Mar. 14, 2024

Related U.S. Application Data

(63) Continuation of application No. 17/827,226, filed on May 27, 2022, now Pat. No. 11,829,356, which is a continuation of application No. 16/694,858, filed on Nov. 25, 2019, now Pat. No. 11,372,853.

(51) Int. Cl.
  *G06F 7/00* (2006.01)
  *G06F 16/21* (2019.01)
  *G06F 16/242* (2019.01)
  *G06F 40/205* (2020.01)

(52) U.S. Cl.
  CPC ........ *G06F 16/2433* (2019.01); *G06F 16/219* (2019.01); *G06F 16/243* (2019.01); *G06F 40/205* (2020.01)

(58) Field of Classification Search
  CPC .. G06F 16/2433; G06F 16/219; G06F 16/243; G06F 40/205; G06F 16/2282; G06F 40/143
  See application file for complete search history.

(56) References Cited

U.S. PATENT DOCUMENTS

| | | | | |
|---|---|---|---|---|
| 5,907,846 A | * | 5/1999 | Berner | G06F 16/284 |
| 5,937,408 A | * | 8/1999 | Shoup | G06F 16/283 |
| | | | | 707/999.102 |
| 5,991,763 A | * | 11/1999 | Long | G06F 9/4401 |
| | | | | 707/999.102 |
| 6,003,040 A | * | 12/1999 | Mital | G06F 16/94 |
| | | | | 715/764 |

(Continued)

OTHER PUBLICATIONS

U.S. Appl. No. 16/694,858 U.S. Pat. No. 11,372,853, filed Nov. 25, 2019, Object-Based Search Processing.

(Continued)

*Primary Examiner* — Mohammed R Uddin
(74) *Attorney, Agent, or Firm* — SCHWEGMAN LUNDBERG & WOESSNER, P.A.

(57) ABSTRACT

Structured data comprising primary data is transformed into object-based data comprising the primary data and at least one search function. The object-based data when loaded into memory provides the search function as executable instructions for an object instance. When an application calls the object instance with search terms as input, the search terms are located within the primary data (which is loaded into memory) by the search function, and the object instance returns corresponding field values from the primary data associated with the search terms to the application.

20 Claims, 5 Drawing Sheets

(56) References Cited

U.S. PATENT DOCUMENTS

| | | | | |
|---|---|---|---|---|
| 6,029,176 | A * | 2/2000 | Cannon | G06Q 30/02 348/E7.063 |
| 6,038,554 | A * | 3/2000 | Vig | G06Q 30/0278 705/306 |
| 6,286,005 | B1 * | 9/2001 | Cannon | G06Q 30/0201 455/2.01 |
| 7,933,787 | B1 * | 4/2011 | Betz, III | G06Q 40/08 705/35 |
| 8,090,598 | B2 * | 1/2012 | Bauer | G07C 5/008 701/1 |
| 8,543,430 | B1 * | 9/2013 | Fields | G06Q 40/08 705/40 |
| 9,412,122 | B2 * | 8/2016 | Trauberg | H04L 9/40 |
| 9,569,464 | B1 * | 2/2017 | Crow | G06F 16/51 |
| 10,109,014 | B1 * | 10/2018 | Bischoff | H04L 67/12 |
| 10,109,027 | B1 * | 10/2018 | Stack | G06Q 50/22 |
| 11,544,434 | B1 * | 1/2023 | Ershov | G06F 30/367 |
| 2002/0062258 | A1 * | 5/2002 | Bailey | G06Q 30/0601 705/26.1 |
| 2003/0187704 | A1 * | 10/2003 | Hashiguchi | G06Q 40/08 705/4 |
| 2004/0267674 | A1 * | 12/2004 | Feng | G06Q 30/06 705/306 |
| 2006/0200772 | A1 * | 9/2006 | Dhanapal | G06Q 10/06 717/100 |
| 2007/0168949 | A1 * | 7/2007 | Shattuck | G06F 9/4492 717/115 |
| 2007/0220022 | A1 * | 9/2007 | Lankinen | G06F 16/258 |
| 2008/0065426 | A1 * | 3/2008 | Ziade | G06Q 40/08 705/4 |
| 2008/0091699 | A1 * | 4/2008 | Nakashima | G06F 40/154 |
| 2009/0287596 | A1 * | 11/2009 | Torrenegra | G06Q 40/04 705/37 |
| 2010/0100398 | A1 * | 4/2010 | Auker | G06Q 50/01 705/4 |
| 2010/0250625 | A1 | 9/2010 | Olenick et al. | |
| 2011/0113319 | A1 * | 5/2011 | Saft | G06F 16/93 715/223 |
| 2011/0213660 | A1 * | 9/2011 | Fontoura | G06Q 30/0254 705/14.52 |
| 2011/0218978 | A1 * | 9/2011 | Hong | G06F 16/2477 707/694 |
| 2011/0314043 | A1 * | 12/2011 | Bernstein | G06F 16/84 707/769 |
| 2014/0149961 | A1 * | 5/2014 | Falk | G06F 8/34 717/105 |
| 2014/0278582 | A1 * | 9/2014 | Shambach | G06Q 40/08 705/4 |
| 2015/0039344 | A1 * | 2/2015 | Kinney | G16H 10/60 705/3 |
| 2015/0128152 | A1 * | 5/2015 | Lachaume | H04L 67/1095 719/316 |
| 2017/0132397 | A1 * | 5/2017 | Leitner | G16H 10/40 |
| 2018/0293660 | A1 * | 10/2018 | Rakshe | G06Q 40/08 |
| 2018/0336638 | A1 * | 11/2018 | Dziabiak | G06F 7/08 |
| 2018/0340790 | A1 * | 11/2018 | Kislovskiy | G01C 21/3484 |
| 2019/0080235 | A1 * | 3/2019 | Maruhashi | G06N 3/045 |
| 2020/0134727 | A1 * | 4/2020 | Atherton | G06Q 10/0635 |
| 2021/0157807 | A1 | 5/2021 | Panetta et al. | |
| 2022/0035601 | A1 * | 2/2022 | Hirota | G06F 8/30 |
| 2022/0292090 | A1 | 9/2022 | Panetta et al. | |

OTHER PUBLICATIONS

U.S. Appl. No. 17/827,226, filed May 27, 2022, Object-Based Search Processing.

"U.S. Appl. No. 16/694,858, Advisory Action mailed Dec. 27, 2021", 3 pgs.

"U.S. Appl. No. 16/694,858, Final Office Action mailed Oct. 14, 2021", 15 pgs.

"U.S. Appl. No. 16/694,858, Non Final Office Action mailed Apr. 28, 2021", 14 pgs.

"U.S. Appl. No. 16/694,858, Notice of Allowance mailed Mar. 2, 2022", 8 pgs.

"U.S. Appl. No. 16/694,858, Response filed Jan. 13, 2022 to Advisory Action mailed Dec. 27, 2021".

"U.S. Appl. No. 16/694,858, Response filed Jul. 28, 2021 to Non Final Office Action mailed Apr. 28, 2021", 10 pgs.

"U.S. Appl. No. 16/694,858, Response filed Dec. 14, 2021 to Final Office Action mailed Oct. 14, 2021", 10 pgs.

"U.S. Appl. No. 17/827,226, Non Final Office Action mailed Jan. 24, 2023", 8 pgs.

"U.S. Appl. No. 17/827,226, Notice of Allowance mailed Jul. 20, 2023", 8 pgs.

"U.S. Appl. No. 17/827,226, Preliminary Amendment filed Jun. 7, 2022", 6 pgs.

"U.S. Appl. No. 17/827,226, Response filed Apr. 24, 2023 to Non Final Office Action mailed Jan. 24, 2023", 7 pgs.

"International Application Serial No. PCT/US2020/062035, International Search Report mailed Feb. 26, 2021", 2 pgs.

"International Application Serial No. PCT/US2020/062035, Written Opinion mailed Feb. 26, 2021", 6 pgs.

* cited by examiner

*Type: match*
*Apply to: principal*
*Match_variables:*
- *Key: age*
- *Key: gender*
- *Key: marital_status*

*Factor_names:*
- *Bi*
- *Pd*
- *Coll*
- *Comp*
- *Med-pay*
- *Uninsured*
- *Rental*
- *Loan*

*Table:*
- *Match_values*
  - *0*
  - *16*
- *F*
- *Single*

*Factors:*
- *1.6756*
- *1.9231*
- *1.9078*
- *4.7658*
- *5.8756*
- *4.8601*
- *1.8000*
- *Match_values*
- *17*
- *F*
- *Single*

*Factors:*
- *1.2345*
- *1.5678*
- *1.4321*
- *5.7932*
- *6.0657*
- *4.1543*
- *3.2134*
- *1.5000*

OBJECT-BASED SEARCH PROCESSING

RELATED APPLICATIONS

This application is a continuation of U.S. patent application Ser. No. 17/827,226, filed May 27, 2022, which is a continuation of U.S. patent application Ser. No. 16/694,858, filed Nov. 25, 2019, which application is incorporated herein by reference in its entirety.

BACKGROUND

Many activities that consumers and companies engage in require search and retrieval processes. Typically, companies maintain data assets in tables or databases, which provide the backbone for internal company operations and user-facing network services. In fact, users no longer have to remember names of people, products, or services because users can find what they are looking for through search interfaces that are pervasively available from web-based browsers or mobile application interfaces (accessible from any user-operated device (e.g., phone, watch, laptop, desktop, voice-based home appliances, etc.)).

Yet, maintaining these tables, databases, and indices are costly, time consuming, and error prone. Furthermore, response times for search engines are heavily dependent upon the underlying structure of the primary data being searched and any metadata produced or maintained with the primary data.

Some companies are heavily dependent on voluminous amounts of primary data maintained in large tables or data stores. The ability to organize and search this data quickly is of utmost importance. A single piece of primary data updated incorrectly can have catastrophic consequences to user and to internal operations that rely on the accuracy of the primary data. Internal applications may also require search and retrieval from the primary data for purposes of providing some other mission-critical calculations.

Most companies embed format or interface-specific logic into their internal applications for any needed search and retrieval against their tables. This unduly complicates the internal applications and makes them dependent on the format and structures of their tables, such that any changes to the tables has a cascading effect on the internal applications.

BRIEF DESCRIPTION OF THE DRAWINGS

FIG. 2 is a diagram of an object data, according to an example embodiment.

DETAILED DESCRIPTION

In various embodiments, methods and a system for object-based search processing are provided.

Figure 1:
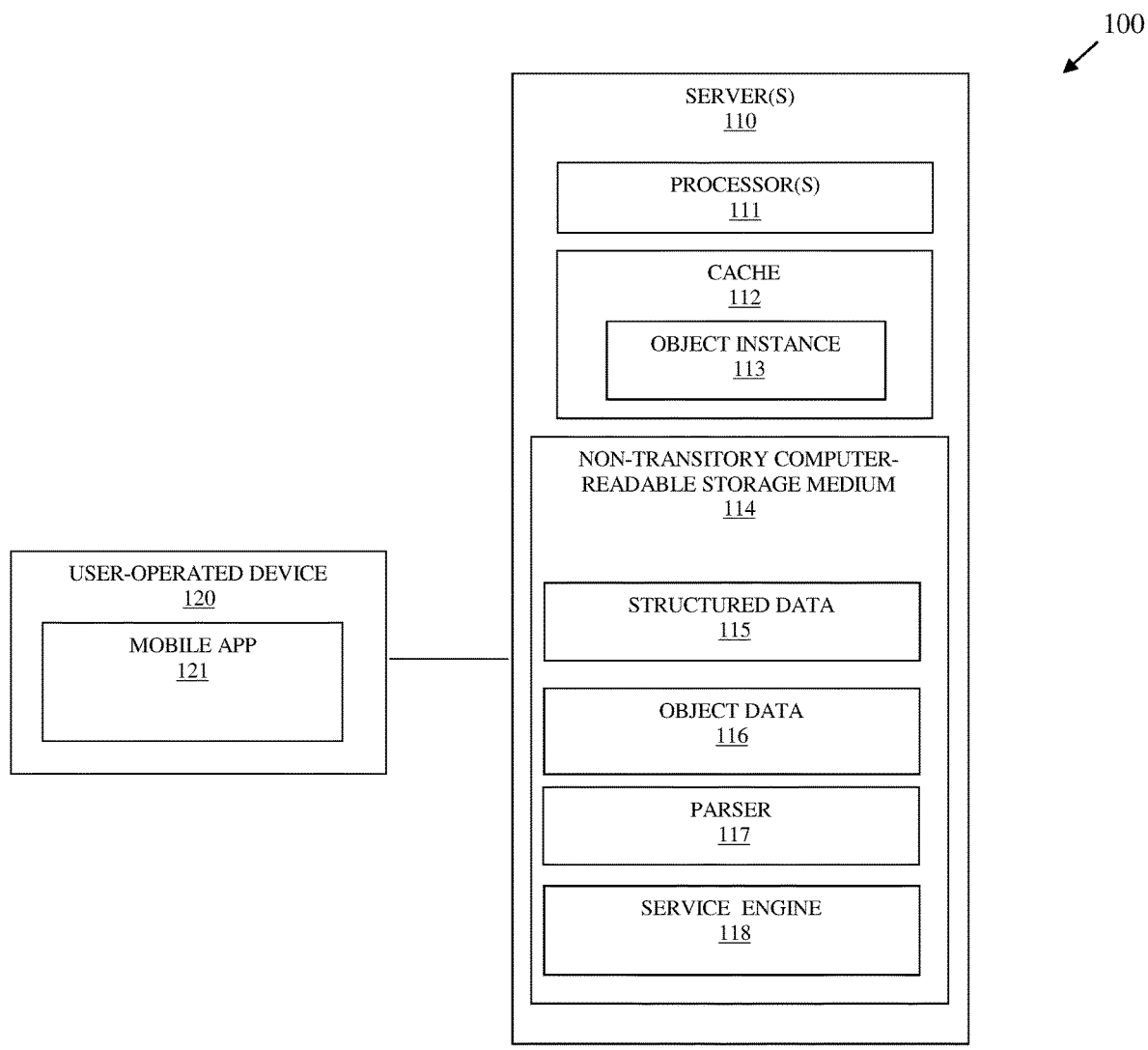
FIG. 1 is a diagram of a system for object-based search processing, according to an example embodiment.

FIG. 1 is a diagram of a system 100 for object-based search processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of adaptive application version integration support, presented herein and below.

As used herein and below, the terms "user," "consumer," and "customer" may be used interchangeably and synonymously. The terms refer to an individual operating a user-device and interacting with a user-facing interface of a mobile application (app) or interacting with a web-based user interface to access features/functions of a network-based service (which itself may be accessible through a web or browser-based API).

As will be discussed in detail below, the system 100 permits a processor-efficient mechanism by which search services can be provided for large tables by reducing the processing time associated with searching the tables and by providing results from table-based searching to the requesting applications quickly. This is achieved by transforming structured table data into object data. The object data is loaded into memory as an object instance comprising a search or match method that is accessible to calling applications. Primary data associated with the original table data is organized within memory based on the object data and the match method of the object instance quickly and efficiently matches any search term provided by the calling application and returns corresponding component pieces of primary data associated with the search term (returns record fields for the matching search term). The calling application can then process the component pieces of primary data in manners dictated by the logic of the calling application.

System 100 includes a plurality of processing devices and device types 110-120. The system 100 includes one or more servers 110 and one or more user-operated devices 120. Server 120 includes one or more processors 111, cache 112, and non-transitory computer-readable storage/memory 114. The cache 113 and the medium/memory 114 include executable instructions that execute on one or more hardware processors 111 of server 110 from the cache 113 and/or the medium/memory 114 as: a parser 117 and a service engine 118. The medium 114 also includes other non-volatile types of data, such as structured data 115 and object data 116.

Each user-operated device 120 includes its own processor and non-transitory computer-readable storage media. The media includes executable instructions, which when executed by the corresponding processors of the user-operated device 120 cause the processors to perform processing for a mobile application ("app") 121. The app 121 interacts directly with the service engine 118 or indirectly interacts with an Application Programming Interface (API) of server 110 (the API then interacts with service engine 118 during the indirect interactions).

It is to be noted that there may be multiple servers 110, such that the different elements 113 and 117-118 may execute on a same server 110 or multiple different servers 110 networked together. Furthermore, multiple servers 110 may be logically cooperating within cloud computing environment and accessible as a single server 110.

Additionally, each element 113 and 117-118 may simultaneously process within different independent processing environments as duplicated instances of elements 113 and 117-118, each processing environment servicing a different set of the user-operated devices 120 for network interaction. A same server 110 may execute different processing environments, such as when the different processing environments are Virtual Machines (VMs) and/or containers. Additionally, at least some of the processing environments may execute on different servers 110 from one another.

During operation of the system 100, structured data 115 represents primary data that is source data upon which searches are conducted. Parser 117 transforms or converts structured data 115 into object data 116 (an example object data 116 is shown and discussed below with FIG. 2). A schema may be provided as input to parser 117, the schema identifying components and structure of records within structured data 115. Parser 117 parses structured data 115 using the schema to produce as output object data 116. Object data 116 represents the original structured data 115 in a format that can be compiled or interpreted at runtime as an object instance 113 when loaded into memory with one or more callable searching routines/functions/methods.

Object data 116 identifies search keys for records of structured data 115 along with record fields for each search key. Moreover, object data 116 includes defined functions/methods that can be processed by the object instance 113. The keys and their corresponding records are tagged and organized, and the primary data associated with the structured data are embedded within the object data as tagged and organized data (the object data 116 also defining the function/method search invocation and processing sequencing).

When object data 116 is loaded into memory of server 110, access to the defined functions/methods are provided through object instance 113 to a calling application, such as service engine 118. That is, search and retrieval of original structured data 115 is transformed into a callable runtime object as object instance 113. There is no need to rely on loading or accessing structured data 115 from a file and using a scan or a load of the primary data into customized internal data structures for searching; rather, loading of object data 116 automatically causes the primary data of structured data 115 to be organized, loaded, and encapsulated through the object instance 113. Search and retrieval functions/methods are obtained through the invocation by service engine 118 of the object instance's method along with search keys provided as the input that is to be matched.

For example, suppose service engine 118 is an insurance rating service that is used to calculate rates for all available policy options for given characteristics known for a driver (the available policy options are based on defined levels of coverage desired by the driver and types of coverage desired by the driver). This requires matching the characteristics and the options to many tables, obtaining the factors that match the characteristics and the options, and using the corresponding factors to calculate a policy quote from the rates based on selected policy options made by the driver. The tables may represent the structured data 115 that is transformed into object data 116 by parser 117 and stored on medium 114 as a file.

An example object data 116 is shown in FIG. 2. Object data identifies a match object instance 113 as "match." When "match" is invoked within the processing logic of service engine 118 with one or more passed characteristics (input search terms/keys) provided as input, object instance 118 matches the terms and returns factors that match the search terms as output to the service engine 118. For example, a 17-year-old single female (17, F, Single) returns factors 1.2345 for Bi, 1.5678 for Pd, 1.4321 for Coll, 1.57932 for Comp, 6.0657 for Med-pay, 4.1543 for Uninsured, 3.2134 for Rental, and 1.5000 for Loan, where Bi is bodily injury coverage factor, Pd is property damage coverage, Coll is collision coverage, Comp is comprehensive coverage, Med-pay is medical payments coverage, Uninsured is uninsured motorist coverage, Rental is rental car coverage, and Loan is gap coverage. Service engine 118 makes a reference to the object instance as "O.match(17,F,Single);" where O is a reference to object instance 113 and match is its publicly-facing function/method. Object instance 113 then populates each factor with their corresponding value matched for the 17-year-old single female obtained by search engine 118 by referencing a specific factor name when needed, e.g., "O.Coll" returns 1.4321 for the collision coverage factor of a 17-year-old single female. A new search would repopulate the factor names (Pd, coil, . . . ) with the corresponding factor values based on matching the new supplied characteristics that were to be matched. The logic of service engine 118 may decide to call the object instance 113 based on a variety of conditions for the user, such as home address of the driver, driving history, type of vehicle being covered, etc. In fact, the original primary structured data 115 may need to be accessed tens or hundreds of times for a given driver/user based on a variety of conditions. The object instance 113 provides an in-memory executable instructions that efficiently pre-organizes the structured data as object data 116, which is embedded in memory and available within the processing environment/context of service engine 118 to provide direct and efficient search and retrieval of the needed factors.

The object data 116 may be viewed as the source code or source instructions representing a user-defined function, such as matching or searching, which when loaded into memory creates executable instructions (object instance 113 either through a compile, a link, or through dynamic interpretation) that can be called and processed to perform the customized user-defined search function in-memory instead of on-file or from storage, which improves processing throughput associated with searching object data 116. Management of the structure of the original structured data 115 is abstracted and hidden from service engine 118; the logic of service engine 118 only needs to know how to invoke the method of the object instance 113 (match), provide the search terms/keys as input, and process the returned matching factors. This reduces the complexity of the source code associated with service engine 118 and logically separates maintenance and support for the structured data 115. Because any changes made to the format or fields of structured data 115 can be handled with a revised schema that is reprocessed by parser 117 using the updated structured data 115. So, service engine 118 may not require any modifications when changes are made to the structured data 115 or minimal changes when factors are added or removed for purposes of being able to use the factors in calculations.

In an embodiment, the object instance 113 when initially loaded to memory is housed in cache 112, such that search and retrieval against the original primary data associated with structured data 115 is available to the service engine 118 through object instance 113 from fast access cache 112.

In an embodiment, service engine 118 checks for the object instance 113 in cache and if object instance 113 is not in cache, service engine 118 loads the object data 116 as object instance 113 into cache 113.

In an embodiment, service engine 118 checks for a presence of object data 116 (such as based on a location of a file, file name, and/or a file with a predefined file name extension (file type) within a predefined network location) and when object data 116 is not present, initiates parser 117 to process structured data 115 and produce object data 116.

In an embodiment, a trigger or an event is raised when structured data 115 is modified or updated. The event causes parser 117 to initiate and generate a new version of object data 116 from the modified or updated structure data 115.

In an embodiment, different versions of object instance 113 may be loaded simultaneously into cache 112, each instance associated with its own unique metadata or naming convention that uniquely identifies a specific version. Each different version representing different versions of primary data associated with structured data 115. So, service engine 118 may call different executed instances of the object instance 113 based on a version number that is associated or assigned to a given structured data 115 and/or object data 116. In this way, a consistent view of rates previously quoted to a policy holder/driver/user may be maintained through an association between the policy holder and a given set of rates (structured data 115 or object data 116).

In an embodiment, service engine 118 may directly or indirectly (through an API) provide information back to a user request that is made through mobile app 121 after processing search results returned by object instance 113 (based on logic of service engine 118). For example, a user may be requesting an insurance policy quote or price from a given set of characteristics and circumstances provided by the user through app 121 or acquired from different sources by service engine 118. Service engine 118 performs searches to obtain factors associated with providing rates for available policy options, calculates the rates based on the returned factor values, and provides the rates through an API to the app 121. When a user/driver selected specific policy options, the rates can be processed to provide a price quote for the selected-policy options. It should be noted that this is but one example, as there can be many other scenarios that rely at least in part on search results returned by object instance 113.

In an embodiment, the structured data 115 is table-formatted data, field-formatted data, and/or record-formatted data.

In an embodiment, object data 116 is in a Yet Another Markup Language (YAML) format/syntax (an example of which is shown in FIG. 2).

Figure 3:
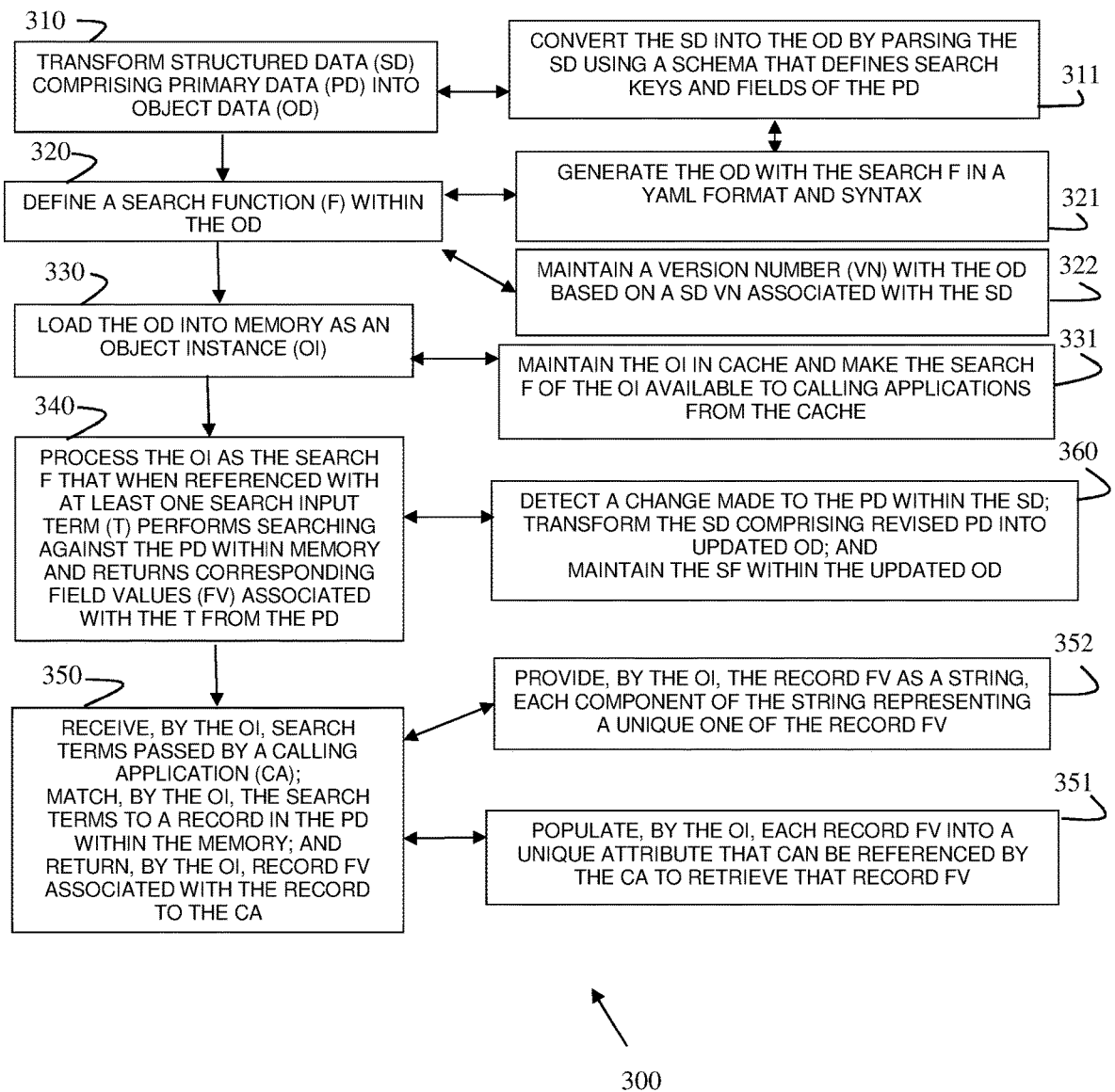
FIG. 3 is a diagram of a method for object-based search processing, according to an example embodiment.

FIG. 3 is a diagram of a method 300 for object-based search processing, according to an example embodiment. The software module(s) that implements the method 300 is referred to as a "search object manager." The search object manager is implemented as executable instructions programmed and residing within memory and/or a non-transitory computer-readable (processor-readable) storage medium and executed by one or more processors of a device. The processor(s) of the device that executes the search object manager are specifically configured and programmed to process the search object manager. The search object manager may or may not have access to one or more network connections during its processing. The network connections can be wired, wireless, or a combination of wired and wireless.

In an embodiment, the device that executes the search object manager is the server 110. In an embodiment, the server 110 is a cloud-based processing environment comprising a collection of physical servers cooperating as a single logical server. In an embodiment, the server 110 is a Local-Area Network (LAN)-based server or a Wide-Area Network (WAN)-based server.

In an embodiment, the search object manager is all or some combination of: parser 117, object data 116 and/or object instance 113.

At 310, the search object manager transforms structured data comprising primary data into object data. The structured data may include field-formatted data, table-formatted data, or record-formatted data. The structured data defining records and fields within each record.

In an embodiment, at 311, the search object manager converts or translates the structured data into object data by parsing the structured data using a schema that defines search keys (special fields) and other fields of the primary data.

At 320, the search object manager defines a search function within the object data. That is, the object data includes the primary data of the structured data and includes the search function embedded with the primary data.

In an embodiment of 311 and 320, at 321, the search object manager generates the object data with the search function in a YAML format and syntax. An example, object data created for an example structured data was presented above in the FIG. 2.

In an embodiment, at 322, the search object manager maintains a version number with the object data based on a structured data version number associated with the structured data. The version number of the object data may be different from the structured data version number, but the version number of the object data unique maps to a specific structured data version number for the structured data.

At 330, the search object manager loads the object data into memory as an object instance. The object code is capable of being complied as object and linked code during loading as the object instance, or the object code is capable of being dynamically interpreted for execution as the object instance after the loading.

In an embodiment, at 331, the search object manager maintains the object instance in cache and makes the search function of the object instance available to calling applications from the cache.

At 340, the search object manager processes the object instance as the search function when referenced with at least one search input term, which causes the search function to perform searching against the primary data within the memory and which causes the search function to return corresponding field values associated with locating the at least one search input term from the primary data.

In an embodiment of 340, and at 350, the object instance, receives search terms passed by a calling application. The object instance matches the search terms to a record in the primary data within the memory and returns record field values associated with the record to the calling application.

In an embodiment of 350, and at 351, the object instance populates each record field value into a unique attribute that can be referenced by the calling application to retrieve that record field value. For example, suppose a record field is identified by an attribute Coll (for collision coverage as used in the example above for the FIG. 2), the calling application may retrieve the value assigned to the attribute as O.Coll, where O is a reference to the object instance and Coll provides the attribute; the object instance populates the Coll attribute with the corresponding value obtained from the primary data for the matching record. In this way, the calling application can reference different record field values as needed based on the logic of the calling application.

In an embodiment of 350 and at 352, the object instance provides the record field values as a string, each component of the string representing a unique one of the record field values. The components within the string may be identified by special characters, such as a comma or a dash; may be identified by tags; or may be identified based on field locations within the string.

In an embodiment, at 360, the search object manager detects a change made to the primary data located within the structured data. In response, the search object manager transforms or translates the structured data comprising the revised primary data into updated object data, and the search object manager maintains the search function within the updated object data.

Figure 4:
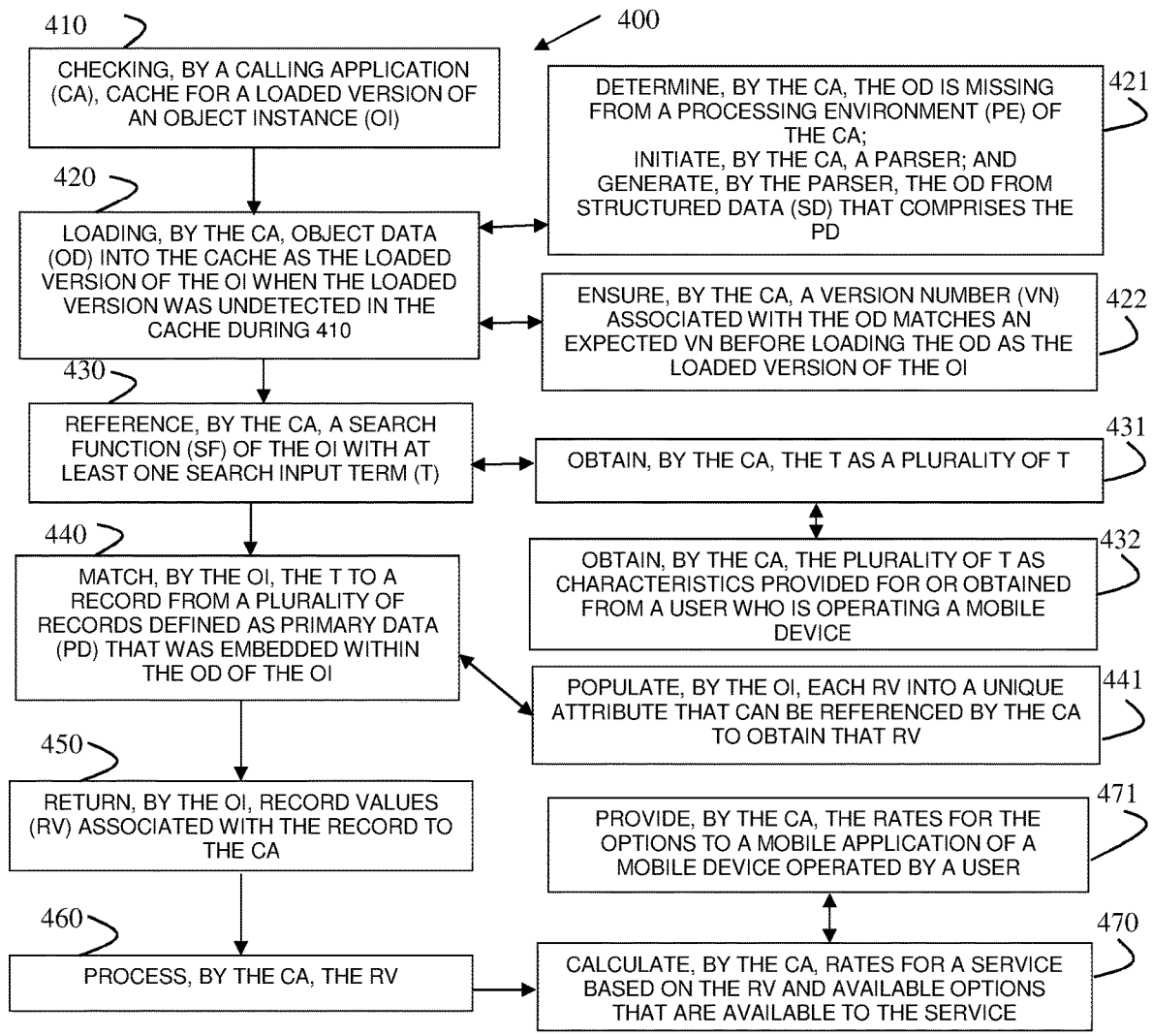
FIG. 4 is a diagram of another method for object-based search processing, according to an example embodiment.

FIG. 4 is a diagram of another method 400 for object-based search processing, according to an example embodiment. The software module(s) that implements the method 400 is referred to as a "search controller." The search controller is implemented as executable instructions programmed and residing within memory and/or a non-transitory computer-readable (processor-readable) storage medium and executed by one or more processors of a device. The processors that execute the search controller are specifically configured and programmed to process the search controller. The search controller may have access to one or more network connections during its processing. The network connections can be wired, wireless, or a combination of wired and wireless.

In an embodiment, the device that execute the search controller is the server 110. In an embodiment, the server 110 is a cloud processing environment, a LAN server, or a WAN server.

In an embodiment, the search controller is all of, or some combination of: object instance 113, object data 116, parser 117, service engine 118, and/or the method 300.

The search controller presents another and, in some ways, enhanced processing perspective of the method 300.

At 410, a calling application of the search controller (such as service engine 118) checks cache for a loaded version of an object instance.

At 420, the calling application, loads object data (such as the example object data in the FIG. 2) into the cache as the loaded version of the object instance when the loaded version was initially undetected in the cache at 410.

In an embodiment, at 421, the calling application determines that the object data is missing from a processing environment of the calling application. In response, the calling application initiates a parser of the search controller (such as parser 117). The parser generates the object data from structured data that comprises the primary data.

In an embodiment, at 422, the calling application ensures that a version number associated with the object data matches an expected version number before loading the object data as the loaded version of the object instance. This allows more than one loaded version of the object data and corresponding object instances to execute from the cache.

At 430, the calling application references a search function of the object instance with at least one search input term. This causes the object instance to process from the cache to perform searching against the primary data using the search input term.

In an embodiment, at 431, the calling application obtains the search input term as a plurality of search input terms.

In an embodiment of 431 and at 432, the calling application obtains the plurality of search input terms as characteristics provided for or obtained from a user who is operating a mobile device. For example, the characteristics can include, by way of a non-limiting example, an age of the user, a gender of the user, and a marital status of the user; such that three input search terms are provided by the calling application when the calling application references the object instance (search function of the object instance).

At 440, the object instance component of the search controller, matches a record from a plurality of records defined as primary data that was embedded within the object data of the object instance. That is, the data being searched is loaded within cache with the object instance and its executable instructions, such that no disk searching is required because the primary data is already within memory (cache) and the processing space of the object instance with the search function of the object instance.

In an embodiment, at 441, the object instance populates each record value into a unique attribute that can be referenced by the calling application to obtain that corresponding record value. This was discussed above with the embodiment at 351 of method 300.

At 450, the object instance returns record values associated with the matched record to the calling application.

At 460, the calling application processes the record values within the logic of the calling application.

In an embodiment, at 470, the calling application calculates rates for a service based on the record values and available options that are available to the service. For example, the calling application calculates rates for available policy options associated with a driving insurance policy by using the record values as factors that match to characteristics of the user and performing calculations on the various factors based on the logic of the calling application to determine the rates. The user may then use an interface to select desired policy options from the available policy options, and the calling application calculates a price quote based on the selected policy options for the user.

In an embodiment of 470 and at 471, the calling application provides the rates for the available policy options to a mobile application of a mobile device operated by a user. This can be done indirectly through an API or directly as was discussed above with the FIG. 1.

Figure 5:
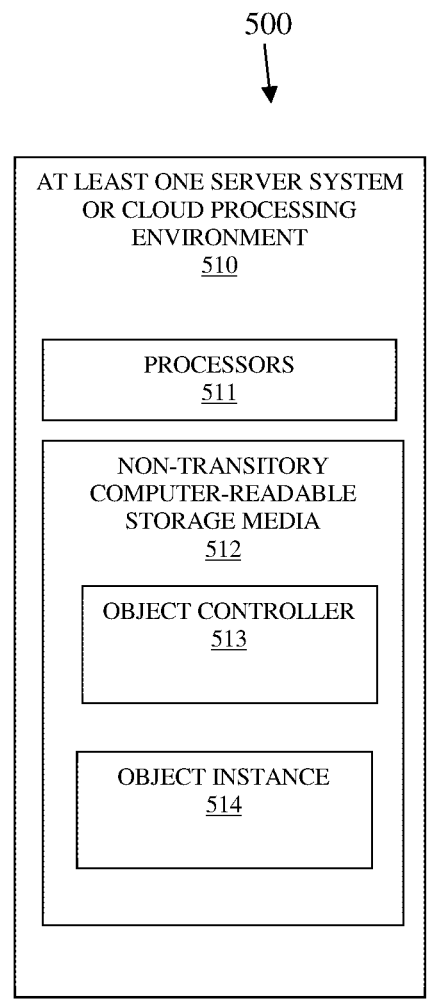
FIG. 5 is a diagram of another system for object-based search processing, according to an example embodiment.

FIG. 5 is a diagram of another system 500 for object-based search processing, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes: at least one server system or a cloud processing environment 510 comprising processors 511 and non-transitory computer-readable storage media 512. The media 512 comprising executable instructions representing an object controller 513 and an object instance 514.

In an embodiment, the object controller 513 is all or some combination of: object data 116, parser 117, method 200, and/or the method 300.

In an embodiment, the object instance 514 is object instance 113, method 200, and/or method 300.

The object controller 513 when executed by at least one of the processors 511 from the non-transitory computer-readable storage media 512 cause the at least one processor 511 to: 1) generate object data 116 from structured data 115 comprising primary data; 2) define a search function within the object data 116; and 3) load the object data 116 into a cache 112 as the object instance 514.

In an embodiment, the object controller 513 when executed by the at least one processor 511 from the non-transitory computer-readable storage medium 512 further causes the at least one processor 511 to perform additional operations comprising: 4) maintain a version number associated with the structured data 115, the object data 116, and the object instance 514; and 5) permit multiple instances of the object instance 514 to be simultaneously loaded into the cache 112, each instance identified by that instance's corresponding version number.

The object instance 514 when executed by at least one of the processors 511 from the non-transitory computer-readable storage media 512 cause the at least one processor 511 to: 1) receive a reference from a calling application 118 to the search function along with at least one search input term; 2) match the at least one search input term to a record from a plurality of records associated with the primary data; and 3) return record values associated with the record to the calling application 118.

To illustrate the methods and systems disclosed herein, a non-limiting list of embodiments is provided here:

Example 1 is a method for object-based search processing. Structured data that comprises primary data is transformed into object data. A search function is defined within the object data. The object data is loaded into memory as an object instance. The object instance is processed as the search function that when referenced with at least one search input term performs searching against the primary data within the memory and returns corresponding field values associated with the at least one search input term from the primary data.

Example 2 includes example 1 and converts the structured data into the object data by parsing the structured data using a schema that defines search keys and filed of the primary data.

Example 3 includes any one of examples 1-2 and generates the object data with the search function in a YAML format and syntax.

Example 4 includes any one of examples 1-3 and assigns a version number to the object data based on a structured data version number associated with the structured data.

Example 5 includes any one of examples 1-4 and maintains the object instance in a cache and makes the search function of the object instance available to calling applications from the cache.

Example 6 includes any one of examples 1-5 and receives, by the object instance, search terms passed by a calling application. The object instance matches the search terms to a record in the primary data within the memory and returns record field values associated with the record to the calling application.

Example 7 includes any one of examples 1-6 and populates, by the object instance, each record field value into a unique attribute that can be referenced by the calling application to retrieve that record field value.

Example 8 includes any one of examples 1-7 and provides, by the object instance, the record field values as a string, each component of the string representing a unique one of the record field values.

Example 9 includes any one of examples 1-8 and detects a change made to the primary data within the structured data. The structured data comprising revised primary data is transformed into updated object data. The search function is maintained with the updated object data.

Example 10 includes a method for object-based searching. A calling application checks cache for a loaded version of an object instance. The calling program loads the object data into the cache as the loaded version of the object instance when the loaded version was undetected in the cache during the check. The calling application references a search function of the object instance with at least one search input term. The object instance matches the at least one search input term to a record from a plurality of records defines as primary data, the primary data was embedded within the object data of the object instance. The object instance returns record values associated with the record to the calling application. The calling application processes the record values.

Example 11 includes example 10 and the calling application calculates rates for a service based on the record values and available options that are available to the service.

Example 12 includes any one of examples 10-11 and the calling application provides the rates for the available options to a mobile application of a mobile device.

Example 13 includes any one of examples 10-12 and the calling application determines that object data is missing from a processing environment of the calling application. The calling application initiates a parser, and the parser generates the object data from the structured data, which comprises the primary data.

Example 14 includes any one of examples 10-13 and the calling application ensures a version number associated with the object data matches an expected version number before loading the object data as the loaded version of the object instance.

Example 15 includes any one of examples 10-14 and the calling application obtains the at least one search input term as a plurality of search input terms.

Example 16 includes any one of examples 10-15 and the calling application obtains the plurality of search input terms as characteristics provided for or obtained from a user who is operating a mobile device.

Example 17 includes any one of examples 10-16 and the object instance populates each record value into a unique attribute that can be referenced by the calling application to obtain that record value.

Example 18 includes a system for object-based searching. The system comprises at least one server system. The at least one server system comprises at least one server having at least one processor and a non-transitory computer-readable storage medium having executable instructions representing an object controller. The object controller when executed by the at least one processor from the non-transitory computer-readable storage medium causes the mobile device processor to perform operations comprising: 1) generating object data from structured data that comprises primary data; 2) defines a search function within the object data; and 3) load the object data into a cache as an object instance; The object instance when executed by the at least one processor from the cache causes the at least one processor to perform operations comprising: 1) receiving a reference from a calling application to the search function along with at least one search input term; 2) match the at least one search input term to a record from a plurality of records associated with the primary data; and 3) return record values associated with the record to the calling application.

Example 19 includes example 18, wherein the at least one server system is a cloud processing environment.

Example 20 includes any one of examples 18-19, wherein the object controller when executed by the at least one processor from the non-transitory computer-readable storage medium further causes the at least one processor to perform additional operations comprising: 4) maintain a version number associated with the structured data, the object data, and the object instance; and 5) permit multiple instances of the object instance to be simultaneously loaded into the cache, each instance identified by that instance's corresponding version number.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   parsing and translating records of structured data into object data associated with objects;
   providing, for each object, at least one function to access corresponding object data; and
   providing the objects within a processing environment for accessing the records via calls made by applications to a corresponding object's at least one function.

2. The method of claim 1 further comprising, providing duplicated objects for the objects within a second processing environment in parallel to the processing environment for accessing the records via other calls made by the other applications of the second processing environment.

3. The method of claim 1, wherein parsing further includes using a schema for the structured data to identify keys, fields, and primary data associated with each record.

4. The method of claim 2, wherein parsing further includes embedding primary data associated with each record within the corresponding object data of a corresponding object.

5. The method of claim 1, wherein providing the objects further includes loading each object into memory associated with the processing environment as executable code.

6. The method of claim 1, wherein providing, for each object, further includes providing, for each object, the at least one function as search and retrieval functions for the applications to call within the processing environment and access corresponding primary data of corresponding records of the structured data.

7. The method of claim 1, wherein providing, for each object, further includes providing, for each object, at least one input parameter for input data used by the at least one function.

8. The method of claim 1, wherein providing, for each object, further includes providing, for each object, the at least one function as a match function that takes as input search criteria provided as input parameters and returns corresponding values associated with the corresponding object data of the corresponding object that matches the input search criteria.

9. The method of claim 1, wherein parsing and translating further includes:
   identifying search keys, fields, and primary data;
   tagging the search keys, the fields, and the primary data; and
   embedding tagged data within the corresponding object data for each object.

10. The method of claim 1, wherein providing, for each object, the at least one function further includes creating the corresponding object data with dynamic interpretable source code for the at least one function that is dynamically executed when called by a corresponding application within the processing environment.

11. The method of claim 10, wherein creating further includes creating the dynamic interpretable source code for the at least one function with input parameters to receive input data provided by the corresponding application during a corresponding call.

12. A method, comprising:
   embedding primary data of records for structured data into sets of object data, wherein each set of object data corresponds to a certain record of the structured data;
   generating source code for searching each set of object data based on input data provided as one or more parameters to a corresponding source code;
   encapsulating each set of object data into an executable instance of an object;
   loading the executable instances of the objects into memory of a processing environment; and
   executing, by the executable instances of the objects, searches based on corresponding input data provided by applications that call the executable instances of the objects from the processing environment.

13. The method of claim 12 further comprising:
   loading second executable instances of the objects into a second memory of a second processing environment; and
   executing, by the second executable instances of the objects and in parallel with the executable instances of the objects in the processing environment, second searches based on additional corresponding input provided by second applications that call the second executable instances of the objects from the second processing environment.

14. The method of claim 12, wherein encapsulating further includes providing the source code as dynamically interpretable source code that does not requiring compiling of the source code to produce the executable instances of the objects.

15. The method of claim 12, wherein encapsulating further includes compiling the source code producing the executable instances of the objects.

16. The method of claim 15, wherein compiling further includes linking the source code for each executable instance of each object within the memory associated with the processing environment.

17. The method of claim 12, wherein encapsulating further includes maintaining a version number with each executable instance of each object.

18. The method of claim 12, wherein loading further includes loading the executable instances of the objects with a cache associated with the processing environment.

19. A system, comprising:

at least one server system comprising at least one server having at least one processor and a non-transitory computer-readable storage medium having executable instructions;

the executable instructions when executed by the at least one processor cause the at least one processor to perform operations comprising:

generating executable instances of objects from records of structured data, wherein each record includes primary data, fields corresponding to the primary data, and keys for a corresponding record, wherein the primary data, the fields, and the keys for each record embedded as object data within each executable instance of a corresponding object;

providing a match function that performs a match on input data against corresponding keys, fields, and primary data within each executable instance of the corresponding object;

loading the executable instances of the objects into cache of a processing environment; and executing, by the executable instances of the objects, the match functions when called by applications with application-provided input data.

20. The system of claim 19, wherein generating further includes maintaining a version number associated with the structured data, the object data, and the executable instances of the objects, wherein loading further includes permitting multiple versions of the executable instances of the objects to be simultaneously loaded into the cache based on corresponding version numbers.

\* \* \* \* \*